(12) United States Patent
Ito

(10) Patent No.: US 12,334,843 B2
(45) Date of Patent: Jun. 17, 2025

(54) DRIVE SYSTEM AND CONTROL METHOD

(71) Applicant: TOSHIBA MITSUBISHI-ELECTRIC INDUSTRIAL SYSTEMS CORPORATION, Chuo-ku (JP)

(72) Inventor: Takumi Ito, Tokyo (JP)

(73) Assignee: TMEIC CORPORATION, Chuo-ku (JP)

( * ) Notice: Subject to any disclaimer, the term of this patent is extended or adjusted under 35 U.S.C. 154(b) by 0 days.

(21) Appl. No.: 18/261,539

(22) PCT Filed: Dec. 17, 2021

(86) PCT No.: PCT/JP2021/046718
§ 371 (c)(1),
(2) Date: Jul. 14, 2023

(87) PCT Pub. No.: WO2023/112303
PCT Pub. Date: Jun. 22, 2023

(65) Prior Publication Data
US 2024/0106361 A1 Mar. 28, 2024

(51) Int. Cl.
*H02P 6/15* (2016.01)
*H02P 21/09* (2016.01)

(52) U.S. Cl.
CPC .......... *H02P 21/09* (2016.02); *H02P 2207/05* (2013.01)

(58) Field of Classification Search
CPC ...... H02P 6/153; H02P 21/09; H02P 2207/05; H02M 7/538
See application file for complete search history.

(56) References Cited

U.S. PATENT DOCUMENTS

| 6,324,085 B2 * | 11/2001 | Kimura | H02M 7/538 |
| | | | 318/811 |
| 2005/0104551 A1 * | 5/2005 | Nishimura | H02P 25/03 |
| | | | 318/719 |
| 2020/0144943 A1 * | 5/2020 | Kanazawa | H02P 6/153 |

FOREIGN PATENT DOCUMENTS

| CN | 103166563 A | 6/2013 |
| JP | 2009-27799 A | 2/2009 |
| JP | 2009-72033 A | 4/2009 |
| JP | 2020-120513 A | 8/2020 |

OTHER PUBLICATIONS

International Search Report Issued Mar. 1, 2022, in PCT/JP2021/046718, filed on Dec. 17, 2021, 4 pages.

* cited by examiner

*Primary Examiner* — Cortez M Cook
(74) *Attorney, Agent, or Firm* — Oblon, McClelland, Maier & Neustadt, L.L.P.

(57) ABSTRACT

A drive system of an embodiment includes an initial phase command generation unit, a rotor phase detection unit, and a drive control unit. The initial phase command generation unit generates a phase command value corresponding to an initial phase of a rotor before startup of a synchronous motor. The rotor phase detection unit detects a phase of the rotor and outputs the phase. The drive control unit controls the driving of the synchronous motor by using the phase command value. The initial phase command generation unit adjusts the phase command value to approach the phase of the rotor of a detection result by using the detection result of the phase of the rotor detected before the startup by the rotor phase detection unit.

6 Claims, 6 Drawing Sheets

| No | PID | θP | | PCID | θPC |
|---|---|---|---|---|---|
| 1 | P1 | θPC1 | ±α | PC1 | θPC1 |
| 2 | P2 | θPC2 | ±α | PC2 | θPC2 |
| 3 | P3 | θPC3 | ±α | PC3 | θPC3 |
| 4 | P4 | θPC4 | ±α | PC4 | θPC4 |
| 5 | P5 | θPC5 | ±α | PC5 | θPC5 |
| 6 | P6 | θPC6 | ±α | PC6 | θPC6 |

DRIVE SYSTEM AND CONTROL METHOD

TECHNICAL FIELD

Embodiments of the present invention relate to a drive system and a control method.

BACKGROUND ART

In a drive system capable of controlling the speed of an excitation type synchronous motor (hereinafter, simply referred to as a synchronous motor), a rotor of the excitation type synchronous motor may start to rotate when the motor is excited at startup. This sometimes causes difficulty to identify a phase of a rotor. In some cases, the synchronous motor may not start when the accuracy lacks in assignment of a phase in a low speed region at stopping and starting up of the synchronous motor.

CITATION LIST

Patent Document

[Patent Document 1]
  Japanese Unexamined Patent Application No. 2009-27799

SUMMARY OF INVENTION

Technical Problem

The problem to be solved by the present invention is to provide a drive system and a control method capable of more accurately assigning a phase in a low speed region when a synchronous motor is stopped and started.

Solution to Problem

A drive system according to an aspect of the embodiment includes an initial phase command generation unit, a rotor phase detection unit, and a drive control unit. The initial phase command generation unit generates a phase command value corresponding to an initial phase of a rotor before startup of a synchronous motor. The rotor phase detection unit detects a phase of the rotor and outputs the phase. The drive control unit controls the driving of the synchronous motor by using the phase command value. The initial phase command generation unit adjusts the phase command value to approach the phase of the rotor of the detection result by using the detection result of the phase of the rotor detected before startup by the rotor phase detection unit.

DESCRIPTION OF EMBODIMENTS

Figure 1A:
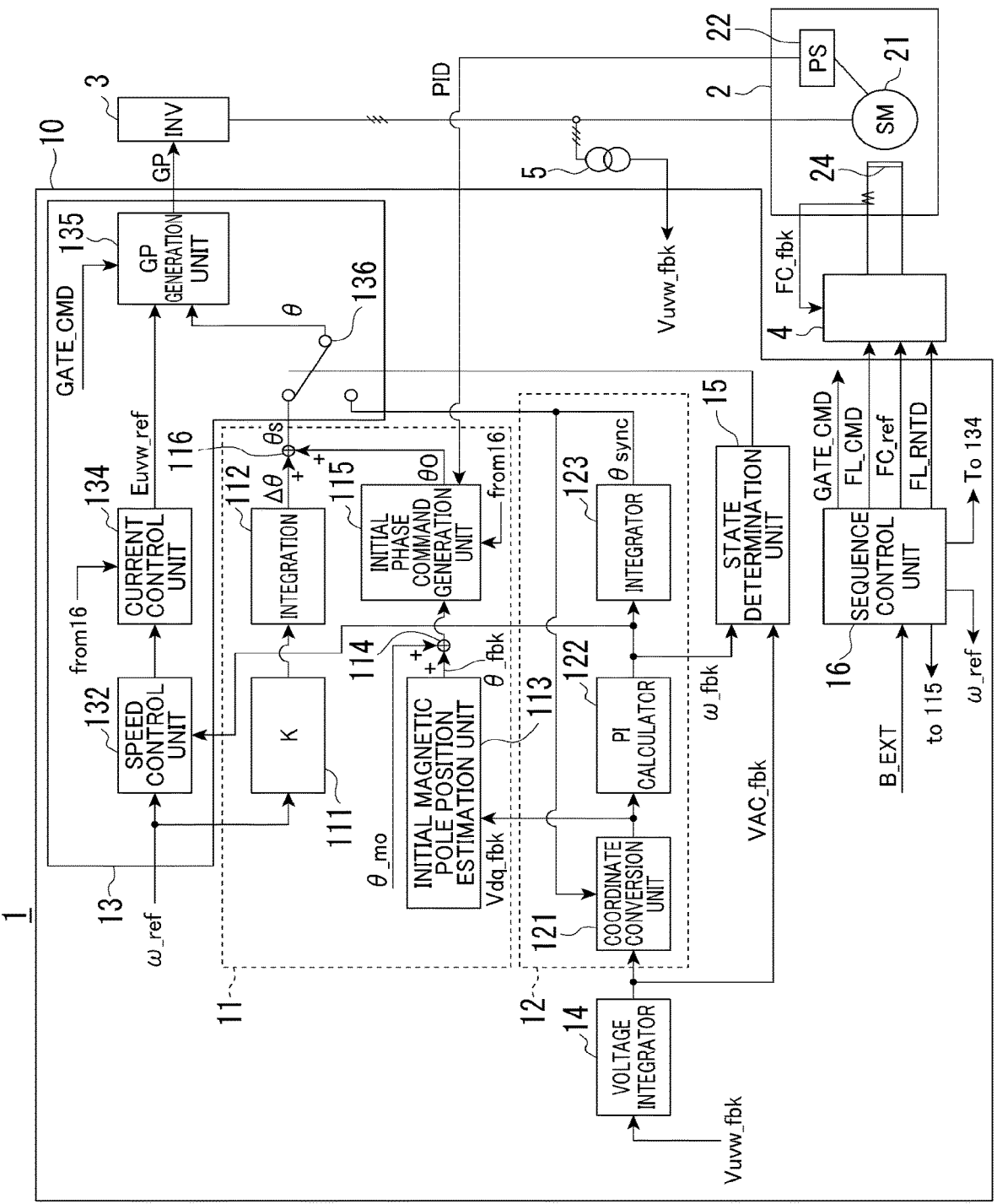
FIG. 1A is a configuration diagram of a drive system of an embodiment.

Hereinafter, a drive system and a control method of an embodiment will be described with reference to the drawings. In the following description, the same reference numerals will be given to the components having the same or similar functions and the overlapping descriptions of those components may be omitted. Additionally, the electrical connection may be simply referred to as "connected".

Figure 1B:
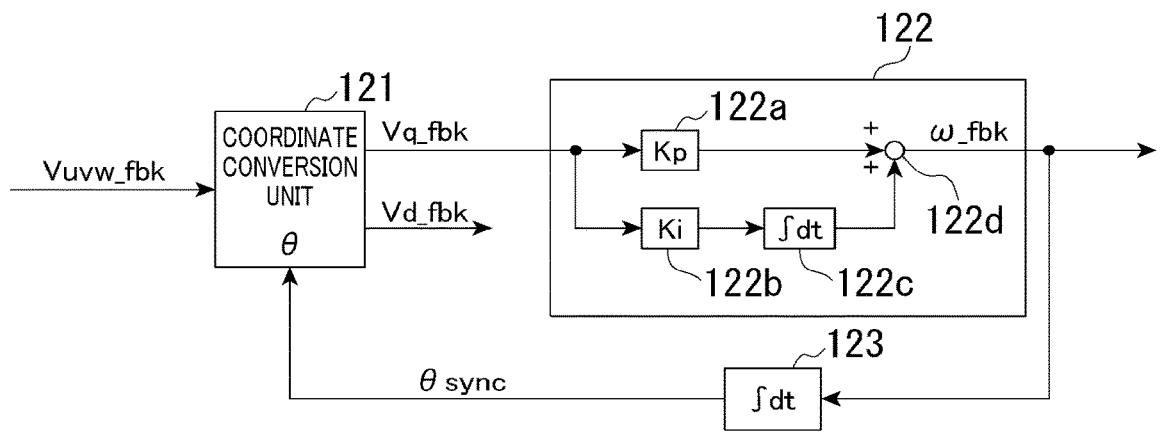
FIG. 1B is a configuration diagram of a second phase estimation unit of the embodiment.

FIG. 1A is a configuration diagram of a drive system 1 of the embodiment. FIG. 1B is a configuration diagram of a second phase estimation unit 12 inside a control unit 10 of the embodiment.

The drive system 1 includes, for example, a synchronous motor 2, an inverter 3, an exciter 4, an instrument transformer 5, and a control unit 10.

Figure 2:
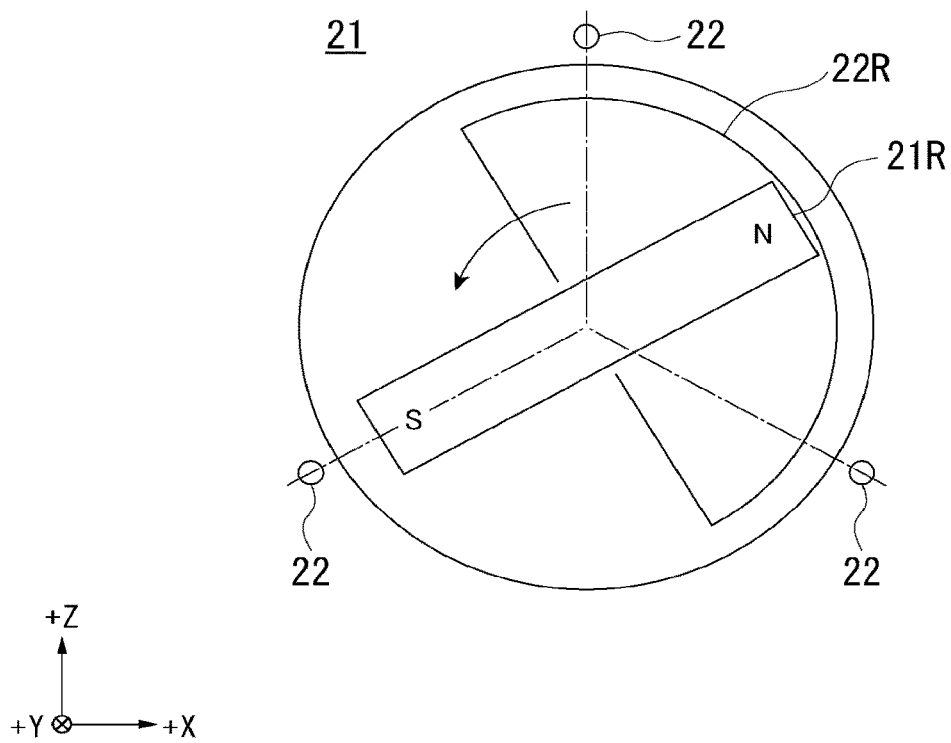
FIG. 2 is a schematic view showing the arrangement of a position detector of the embodiment.

The synchronous motor 2 includes a main body 21 and a position detector 22 (FIG. 2, the rotor phase detection unit).

The synchronous motor 2 is, for example, an excitation type synchronous motor provided with a field winding 24.

A rotor 21R (FIG. 2), a stator winding (not shown), and a field winding 24 are provided inside the main body 21 of the synchronous motor 2. The synchronous motor 2 is driven by, for example, three-phase AC power of U, V, and W phases. The detailed description of the main body 21 of the synchronous motor 2 will be omitted, but an excitation type synchronous motor having a general structure may be adopted.

Figure 3A:
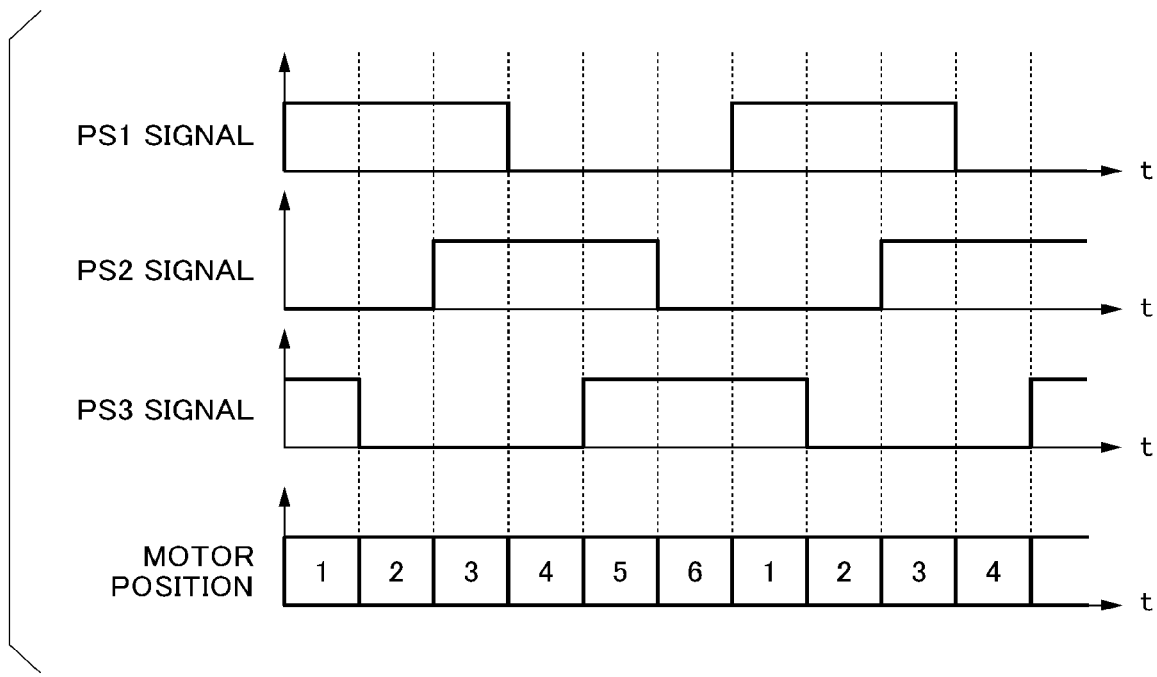
FIG. 3A is a diagram showing a relationship between an output signal of a position detector and a rotor phase used for position control of the embodiment.
Figure 3B:
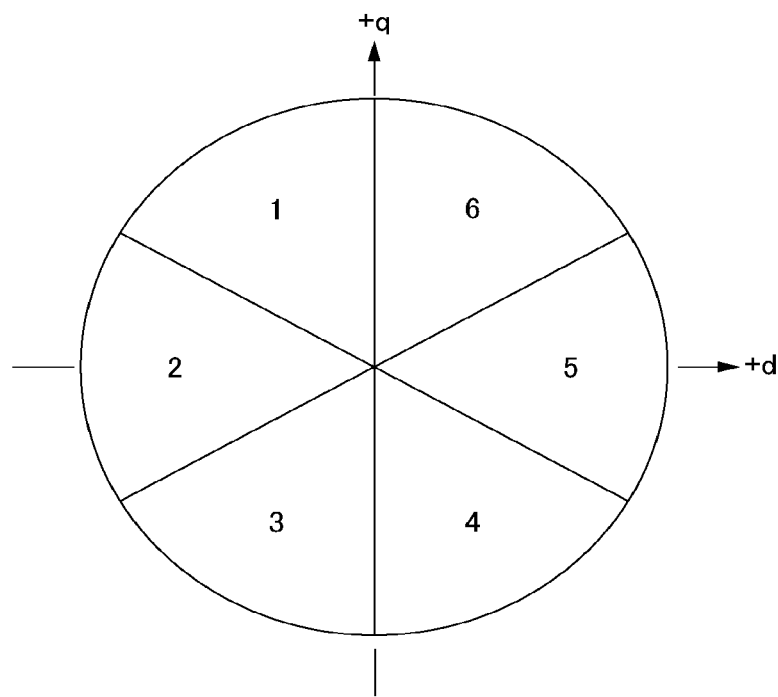
FIG. 3B is a diagram showing a rotor coordinate used for position control of the embodiment.

Referring to FIGS. 2 to 3B, the position detection of the rotor 21R of the embodiment will be described.

FIG. 2 is a schematic diagram showing the arrangement of the position detector 22 of the embodiment. FIG. 3A is a diagram showing a relationship between an output signal of the position detector 22 and a rotor phase used for position control of the embodiment. FIG. 3B is a diagram showing a rotor coordinate used for position control of the embodiment.

The schematic view shown in FIG. 2 shows the position of the position detector 22 when the position detector 22 is viewed from the axial direction.

A rotation body 22R for the position detector 22 rotating together with a shaft is provided in the shaft of the rotor 21R. The position detector 22 detects the position (referred to as the rotor position) of the rotor 21R by detecting the position of the rotation body 22R. Additionally, the detection accuracy of the position detector 22 may have an accuracy that can identify angle regions in which one lap is equally divided into several divisions.

For example, the position detector 22 is a proximal sensor switch (a proximity switch). The position detector 22 detects the rotor position with a resolution of 60° using a semicircular rotation body 22R and three proximity switches arranged to be shifted by 120° in the circumferential direction of the shaft. For example, the rotor positions are shown by the identification numbers from 1 to 6. The position detector 22 shows the detected rotor position as the position number using the values of 1 to 6 and outputs this position number as position information.

FIG. 3A shows a relationship between a detection result of the position detector 22 and a PS1 signal, a PS2 signal, and a PS3 signal respectively output from three proximity switches of the position detector 22 during rotation as a timing chart.

The PS1 signal, the PS2 signal, and the PS3 signal are two-value signals with a duty ratio of 50%. Depending on the arrangement positions of the proximity switches, the phases of the signals are shifted by 120°. The position detector 22 generates position information identified by, for example, the values of 1 to 6 by converting the combination of the logical values indicated by the PS1 signal, the PS2 signal, and the PS3 signal. In this way, the position detector 22 is formed in a lower resolution compared to the resolution of the position sensor such as a rotary encoder used for general position control. Additionally, the application of the rotary encoder having a relatively high resolution is not limited as the position detector 22. For example, when the signal detected by the relatively high-resolution rotary encoder is converted into a low-resolution signal, the rotary encoder can be treated in the same way as the position detector 22.

FIG. 3B shows the position of the detection result of the position detector 22 by using a rotor coordinate. The rotor coordinate has orthogonal d and q axes. The angle regions of 1 to 6 are divided in a counterclockwise from the direction of the +q axis. The angle regions are equally divided into predetermined angles defined larger in the range of detection accuracy required to start the synchronous motor 2.

Returning to FIG. 1A, the description of the drive system 1 is continued.

An inverter 3 is a power converter including multiple semiconductor switching elements. The inverter 3 converts DC power into three-phase AC power and supplies the AC power to the synchronous motor 2. The configuration of the inverter 3 is not limited and a general configuration may be adopted.

The exciter 4 supplies desired DC power to the field winding 24 of the synchronous motor 2.

In the instrument transformer 5, a primary winding is connected to an electric line of each phase connecting the inverter 3 and the synchronous motor 2 and a voltage according to the voltage of each phase is output to a secondary winding.

The control unit 10 includes a first phase estimation unit 11, a second phase estimation unit 12, a drive control unit 13, a voltage integrator (state estimation unit) 14, a state determination unit 15, and a sequence control unit 16.

Additionally, the control unit 10 includes, for example, a processor such as a CPU and may realize some or all of function units such as the first phase estimation unit 11, the second phase estimation unit 12, the drive control unit 13, the voltage integrator 14, the state determination unit 15, and the sequence control unit 16 in such a manner that the processor executes a predetermined program. Alternatively, the above may be realized by the combination of electric circuits (circuitry). The control unit 10 may execute a transfer process of each data using a memory area of a storage unit provided therein and a calculation process for analysis by executing a predetermined program using a processor. For example, the control unit 10 may be a so-called computer and may be configured using a Field Programmable Gate Array (FPGA).

The sequence control unit 16 controls the following units at a predetermined timing to execute a desired operation. The details of the control will be described later.

The first phase estimation unit 11 generates a first phase θs obtained by estimating the phase of the rotor 21R on the basis of an initial phase in a rotor coordinate system corresponding to an actual rotor position at the startup stage of the synchronous motor 2. The first phase estimation unit 11 corrects the first phase by using the detection result of the rotor position detected from the start of the startup procedure of the synchronous motor 2 to the successful startup.

The second phase estimation unit 12 generates a second phase obtained by estimating the phase of the rotor 21R on the basis of the operation state of the synchronous motor 2. The state determination unit determines the operation state of the synchronous motor 2.

The drive control unit 13 controls the driving of the synchronous motor 2 by using any one of the first phase θs and the second phase according to the determination result of the operation state of the synchronous motor 2.

A voltage vector Vuvw_fbk is calculated on the basis of the detection value obtained by integrating the phase voltages of the synchronous motor 2 and the voltage integrator (state estimation unit) 14 and further a voltage value V_fbk^- abs of an index indicating the amplitude of the phase voltage is calculated.

The state determination unit 15 determines the operation state of the synchronous motor 2. For example, the state determination unit 15 may determine the operation state of the synchronous motor 2 on the basis of the voltage value V_fbk^abs and the speed ω_fbk to be described later.

Hereinafter, more detailed configuration examples of the above units will be described.

As shown in FIG. 1B, the second phase estimation unit 12 includes, for example, a coordinate conversion unit 121, a PI calculator 122, and an integrator 123.

The coordinate conversion unit 121 calculates a field voltage feedback Vdq_fbk by using a second phase θsync on the basis of a field voltage feedback Vuvw_fbk generated by the voltage integrator 14. This calculation is, for example, a dq conversion that converts a three-phase signal into a two-phase signal of the rotor coordinate system.

The PI calculator 122 performs a proportional integral calculation of which characteristics are defined by a coefficient of a predetermined value on the basis of the value of the q-axis component (voltage Vq_fbk) of the field voltage feedback Vdq_fbk described above.

For example, the PI calculator 122 includes calculation blocks 122a, 122b, 122c, and 122d. The calculation block 122a performs a proportional calculation on the voltage Vq_fbk by using a coefficient Kp. The calculation block 122b performs a proportional calculation on the voltage Vq_fbk by using a coefficient Ki. Additionally, the coefficient Ki is used as a coefficient for integral calculation. The calculation block 122c performs an integral calculation on the product of the coefficient Ki and the voltage Vq_fbk which is the calculation result of the calculation block 122b. The calculation block 122d adds the proportional calculation result of the calculation block 122a and the integral calculation result of the calculation block 122c.

The integrator 123 integrates the proportional integration calculation result by the PI calculator 122 to generate the second phase θsync.

Accordingly, the second phase estimation unit 12 constitutes PLL by using the coordinate conversion unit 121, the PI calculator 122, and the integrator 123.

As shown in FIG. 1A, the first phase estimation unit 11 includes, for example, a proportional calculation unit 111, an integral calculation unit 112, an initial magnetic pole position estimation unit 113, an addition calculation unit 114, an initial phase command generation unit 115, and an addition calculation unit 116.

The proportional calculation unit 111 performs a proportional calculation on a speed command ω_ref by using a coefficient K.

The integral calculation unit 112 (integration) integrates the proportional calculation result of the proportional calculation unit 111 to generate a phase Δθ. The phase Δθ corresponds to an angle in which the rotor 21R rotates after startup.

The initial magnetic pole position estimation unit 113 estimates an initial magnetic pole position θ_fbk on the basis of the field voltage feedback Vdq_fbk. The initial magnetic pole position estimation unit 113 calculates the initial magnetic pole position θ_fbk by using the following formula (1).

$$\theta\_fbk = \tan^{-1}(Vd\_fbk/Vq\_fbk) \quad (1)$$

The addition calculation unit 114 adds a phase offset value θ_mo (initial magnetic pole position offset) related to the initial magnetic pole position to the initial magnetic pole position 0_fbk. The phase offset value 0_mo may be, for example, a value set in advance by adjustment at the time of installation. The initial phase command generation unit 115 generates an initial phase command θ0 on the basis of the calculation result of the addition calculation unit 114. The addition calculation unit 116 generates the first phase θs by adding the phase Δθ generated by the integral calculation unit 112 to the initial phase command θ0 generated by the initial phase command generation unit 115. This first phase θs is used for the startup stage of the synchronous motor 2.

As described above, the first phase θs is estimated from the phase of the rotor 21R on the basis of the initial phase of the rotor coordinate system. The first phase estimation unit 11 corrects the first phase by using the detection result of the rotor position detected from the start of the startup procedure of the synchronous motor 2 to the successful startup. The start of the startup procedure of the synchronous motor 2 means, for example, starting to supply an excitation current to the field winding 24.

As shown in FIG. 1A, the drive control unit 13 includes, for example, a speed control unit 132, a current control unit 134, a GP control unit 135, and a switching unit 136.

The speed control unit 132 generates a current command in which an estimated speed ω_fbk matches the speed command ω_ref on the basis of the speed command ω_ref. The current control unit 134 generates a voltage command Euvw_ref in which an estimated current matches the current command on the basis of the current command. The GP control unit 135 generates a gate pulse on the basis of the voltage command Euvw_ref and the phase θ. For example, the GP control unit 135 uses the voltage command Euvw_ref as a coefficient and generates a sine wave of each phase of UVW by using a sine value of the phase θ. The GP control unit 135 generates a gate pulse of each phase by PWM-modulating the sine wave of each phase of the UVW using a triangle carrier signal. Additionally, the generation of the gate pulse of each phase using the GP control unit 135 is not limited to the above method, and a general method can be adopted instead.

The switching unit 136 selects any one of the first phase 0s generated by the first phase estimation unit 11 and the second phase θsync generated by the second phase estimation unit 12 on the basis of the determination result of the state determination unit and outputs the selection result as the phase θ.

In this way, the drive control unit 13 controls the driving of the synchronous motor 2 by using any one of the first phase 0s and the second phase according to the determination result of the operation state of the synchronous motor 2.

Next, initial magnetic pole position detection at startup of the embodiment will be described with reference to FIG. 4.

Figure 4:
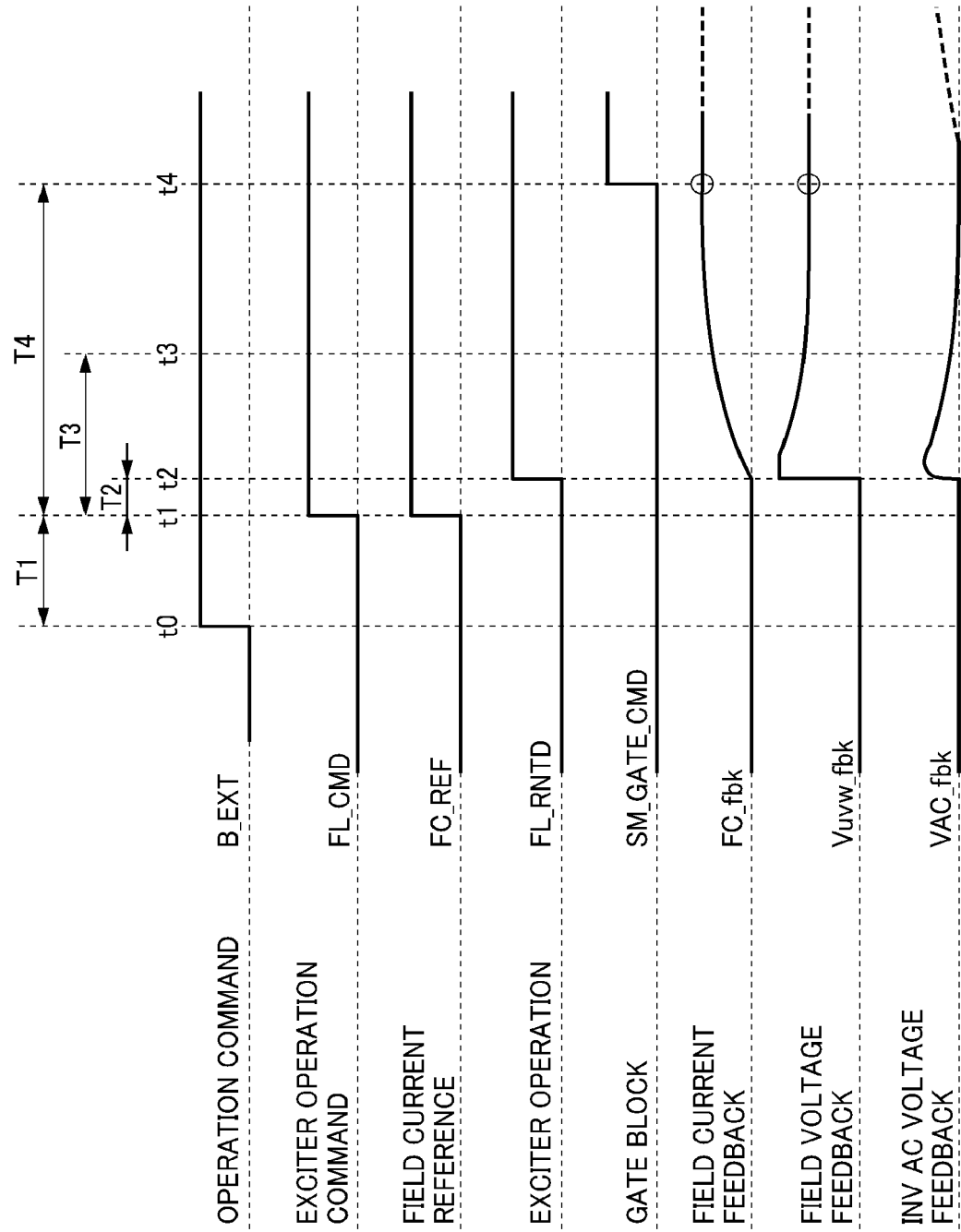
FIG. 4 is a timing chart relating to initial magnetic pole position detection at startup of the embodiment.

FIG. 4 is a timing chart relating to the initial magnetic pole position detection at startup of the embodiment.

In FIG. 4, signals of an operation command B_EXT, an exciter operation command FL_CMD, a field current reference FC_ref, an exciter operation FL_RNTD, a gate command GATE_CMD, a field current feedback FC_fbk, a field voltage feedback Vuvw_fbk, and an AC voltage feedback VAC_fbk are arranged in order from the upper side and a change in amplitude of each signal is shown.

The operation command B_EXT is the operation command of the drive system 1 supplied from an upper-level device.

The H level of this signal indicates the operation of the synchronous motor 2, and the L level of this signal indicates the stop thereof. For example, the transition of this signal from L level to H level indicates the start of operation (or startup).

When the H level indicating the start of the operation is supplied by the operation command B_EXT, the sequence control unit 16 generates a signal for starting the synchronous motor 2. The signals of the exciter operation command FL_CMD, the field current reference FC_ref, and the exciter operation FL_RNTD are examples of the signals for starting the synchronous motor 2. The exciter operation command FL_CMD activates the exciter 4 to enable the output of the excitation current. The field current reference FC_ref indicates a reference level that defines the magnitude of the field current. The exciter operation FL_RNTD is a signal for outputting an excitation current from the exciter 4 after the exciter 4 is activated.

The gate command GATE_CMD is a control signal for controlling the supply of the gate pulse with respect to the inverter 3. When this signal becomes H level, a gate pulse is supplied to the inverter 3, and when this signal becomes L level, the supply of the gate pulse to the inverter 3 is stopped. The sequence control unit 16 generates the exciter operation command FL_CMD, the field current reference FC_ref, the exciter operation FL_RNTD, and the gate command GATE_CMD and controls each unit inside the control unit 10 by using these.

The field current feedback FC_fbk is the amplitude of the current indicated by the detection value of the current flowing through the field winding 24 detected by the transformer provided in the wiring connected to the field winding 24. The field voltage feedback Vuvw_fbk is the amplitude of the voltage indicated by the detection value of the voltage across both ends of the field winding 24. The AC voltage feedback VAC_fbk→abs (referred to as VAC_fbk) is a detection value of the three-phase AC voltage.

In the initial stage shown in FIG. 4, the synchronous motor 2 is stopped. The operation command B_EXT, the exciter operation command FL_CMD, the exciter operation FL_RNTD, and the gate command GATE_CMD are at the L level. The field current reference FC_ref, the field current feedback FC_fbk, the field voltage feedback Vuvw_fbk, and the AC voltage feedback VAC_fbk are all at the L level.

At the time t0, the operation command B_EXT transitions to H level. The sequence control unit 16 detects this transition and starts the timer T1. The period of the timer T1 may be set in advance.

The timer T1 expires at the time t1. In response to this, the sequence control unit 16 outputs the exciter operation command FL_CMD at the H level, changes the field current reference FC_ref to a desired level in steps, and starts the timers T2 to T4. The period from the timers T2 to T4 may be set in advance. Additionally, the sequence control unit 16 maintains the output levels of other signals.

The timer T2 expires at the time t2. In response to this, the sequence control unit 16 outputs the exciter operation FL_RNTD at the H level. The exciter 4 detects this and starts the output of the voltage and the supply of the field current. The output voltage of the exciter 4 also rises at the same time. In response to this, the amplitudes of the field current feedback FC_fbk and the field voltage feedback Vuvw_fbk change. The voltage integrator 14 integrates the field voltage feedback Vuvw_fbk to generate the AC voltage feedback VAC_fbk.

The timer T3 expires at the time t3. The period of the timer T3 corresponds to the period for calculating the initial position. The coordinate conversion unit 121 calculates the field voltage feedback Vdq_fbk on the basis of the field voltage feedback Vuvw_fbk using the initial value of the second phase θsync. This calculation is, for example, a dq conversion that converts a so-called three-phase signal into a two-phase signal in the rotor coordinate system. The initial magnetic pole position estimation unit 113 uses the elements of the field voltage feedback Vdq_fbk to calculate the initial magnetic pole position θ_fbk according to the above-described formula (1).

The addition calculation unit 114 adds an initial magnetic pole position offset θ_mo and the initial magnetic pole position θ_fbk to calculate the initial position θ_0 according to the following formula (2).

$$θ\_0 = θ\_mo + θ\_fbk \quad (2)$$

The timer T4 expires at the time t4. The initial phase command generation unit 115 compares the position number of the phase indicated by the initial position 0_0 of the calculation result of the addition calculation unit 114 with the position number detected by the position detector 22 and adjusts the initial phase command θ0 by a predetermined method when the actual phase detected by the position detector 22 does not follow the initial phase command θ0. This adjustment will be described later. When the startup of the synchronous motor 2 using the initial phase command θ0 succeeds, the sequence control unit 16 sets the gate command GATE_CMD to H level and starts the supply of the AC power from the inverter 3 to the synchronous motor 2 in response to this.

Figures 5, 6:
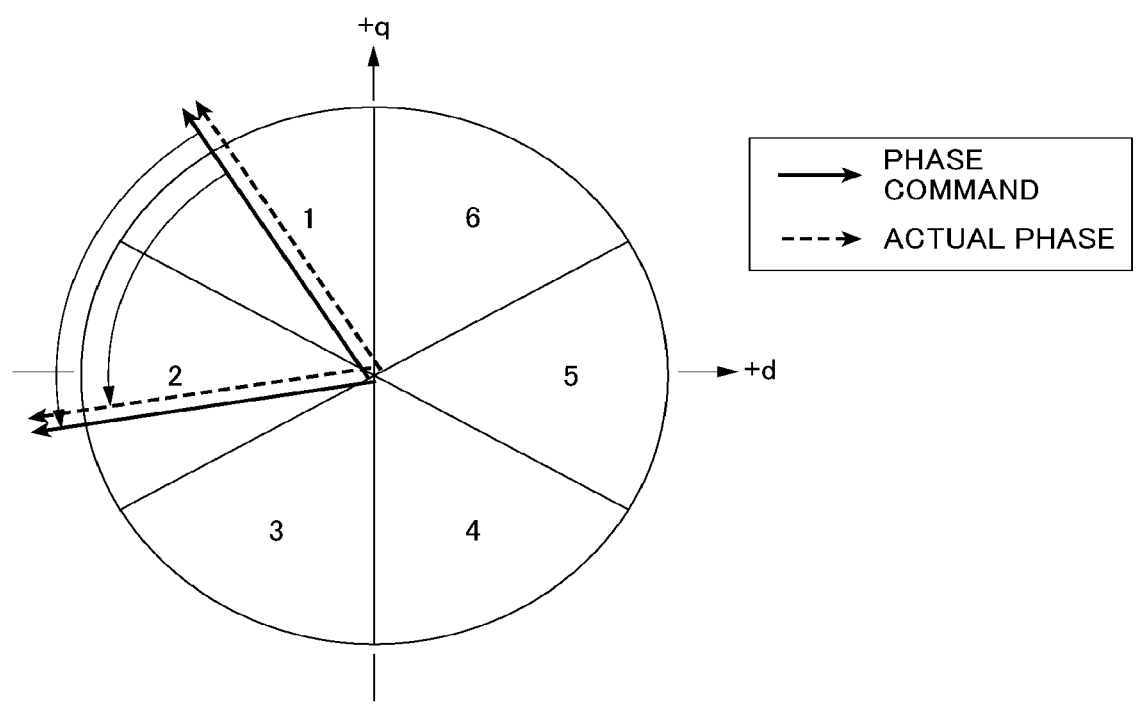
FIG. 5 is a diagram showing a relationship between a position and a position number output from a position detection unit of the embodiment.
FIG. 6 is a diagram showing a case where normal startup is performed in the embodiment.

Referring to FIG. 5, a relationship between the position and the position number output from the position detector 22 of the embodiment will be described. FIG. 5 is a diagram showing a relationship between the position and the position number output from the position detector 22 of the embodiment.

A relationship of six regions identified using identification information PID from P1 to P6, an angle range θP assigned to the regions, identification information PCID of a center position in the region, and an angle θPC of a center position is shown. For example, in a region in which the identification information PID is identified as P1, PC1 is the center position in the region in the identification information PCID. The position of PC1 is θPC1 and the angle range of the region P1 is within ±α centered on θPC1. Other regions P2 to P6 centered on PC2 to PC6 are the same as above.

Figure 7:
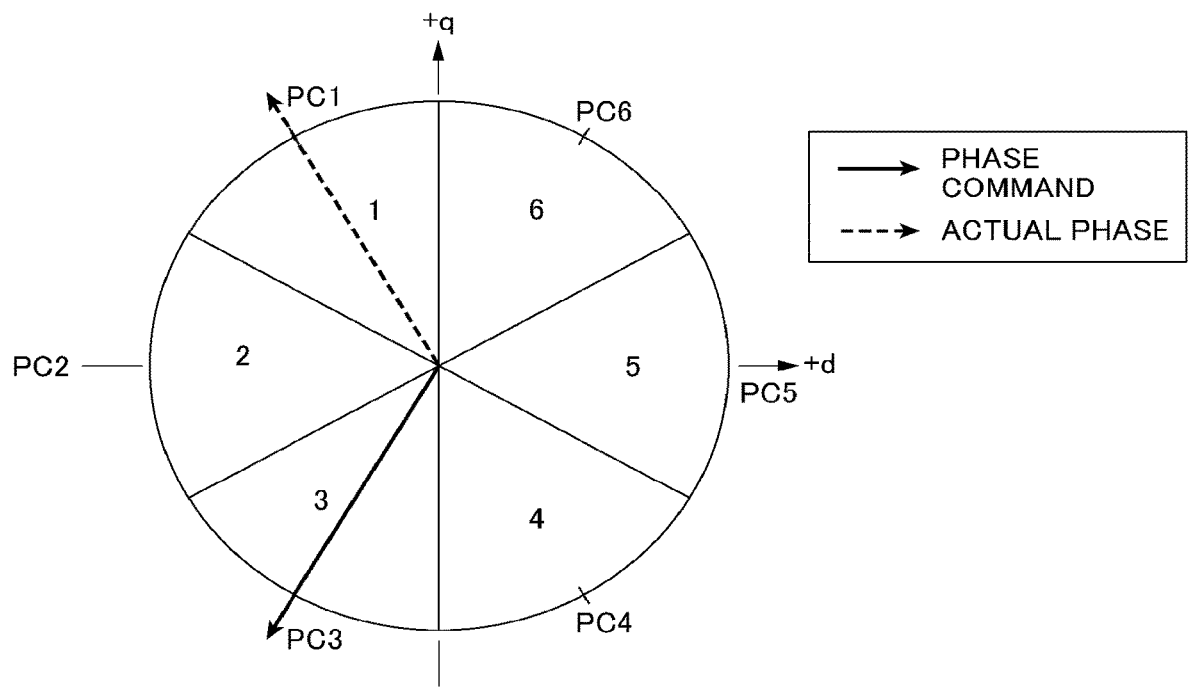
FIG. 7 is a diagram showing a case where normal startup is not performed in the embodiment.
Figure 8:
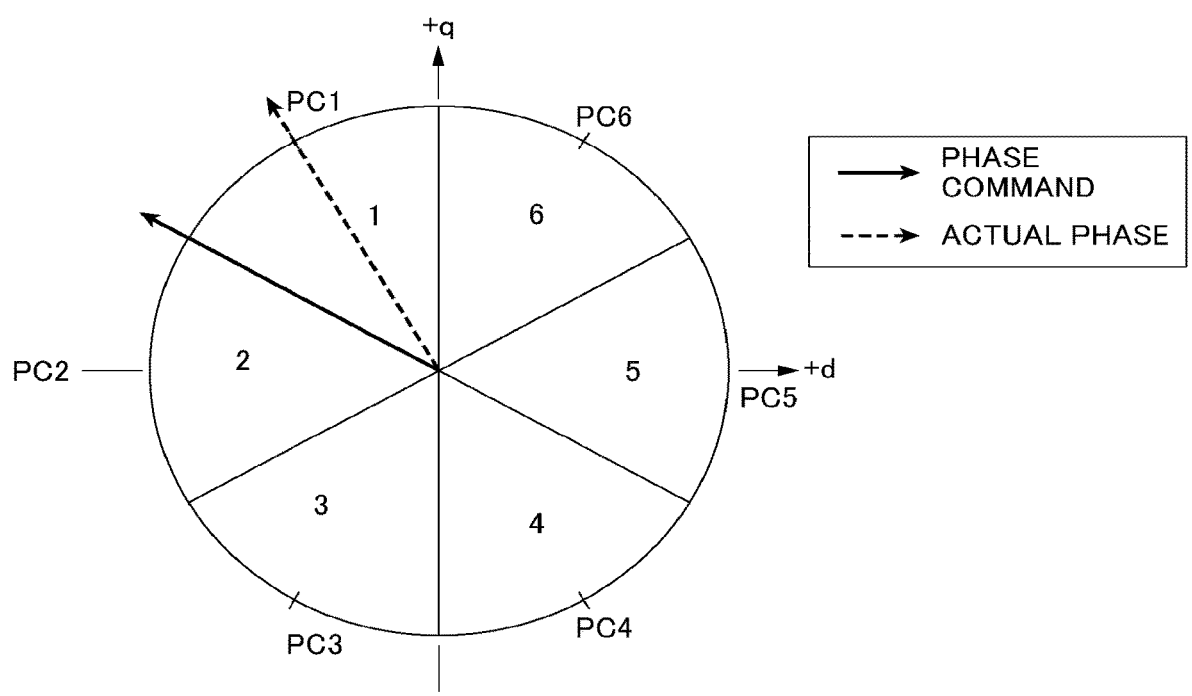
FIG. 8 is a diagram showing a case of correcting a value of an initial phase of a phase command shown in FIG. 7.

Referring to FIGS. 6 to 8, an operation at startup of the embodiment will be described.

FIG. 6 is a diagram showing a case of normal startup of the embodiment. An example shown in FIG. 6 shows a case of normal startup. If there is no problem in estimating the initial magnetic pole position and a sufficient current for the required starting torque can be supplied, the motor rotates at a desired speed on the basis of the phase command.

With reference to FIGS. 4, 7, and 8, a case where a normal startup is not performed in the embodiment and countermeasures thereof will be described.

FIG. 7 is a diagram showing a case where a normal startup is not performed in the embodiment. FIG. 8 is a diagram showing a case in which the value of the initial phase of the phase command shown in FIG. 7 is corrected.

For example, the initial phase which is the phase of the phase command used for control at startup of the synchronous motor 2 is determined at the stage before the startup of the synchronous motor 2. In the case of a comparative example, the synchronous motor 2 may not start normally depending on the suitability of the initial phase based on this phase command.

In this embodiment, when the synchronous motor 2 is started according to the procedure shown in FIG. 4, the initial phase of the phase command is adjusted at a stage before the synchronous motor 2 is started to increase the possibility of startup. This will be described below.

The stage before the startup of the synchronous motor 2 may be, for example, a period from the time t0 to the time t1 in FIG. 4. This stage is a stage before the start of excitation of the synchronous motor 2 after the operation command B_EXT supplied from the upper-level device transitions to the H level. For example, the process of this embodiment may be performed before the period of the timer T1 expires after the sequence control unit 16 detects this transition of the operation command B_EXT and starts the timer T1.

As shown in FIG. 7, the position number based on the phase command and the actual rotor position number (identification information PID) may differ from each other before the synchronous motor 2 is started, and the difference thereof may be relatively large. The state shown in the drawing is an example. For example, the position number according to the phase command is in a region identified as P3, but the actual rotor position number is in a region identified as P1. A more desirable state in the startup stage is that the position number according to the phase command matches the actual rotor position number at the startup of the synchronous motor 2. The mismatch between the position number according to the phase command and the actual rotor position number should be resolved by correcting the phase command. Additionally, the actual rotor position number corresponds to the actual phase detected by the position detector 22. This may be indicated by identification information PID.

For example, as shown in FIG. 8, the initial phase indicated by the phase command is corrected to the position corresponding to the actual position number by correcting the initial phase indicated by the phase command to the boundary phase between the actual position number region "1" and the adjacent position number region "2" before the startup of the synchronous motor 2. The synchronous motor 2 may be started by using a position indicated by the phase command after correction.

For example, the position detector 22 outputs a detection phase corresponding to the phase of the rotor detected before startup.

The initial phase command generation unit 115 receives control from the sequence control unit 16 at the stage when the transition of the operation command B_EXT is detected. The initial phase command generation unit 115 acquires the output of the position detector 22 by receiving the control from the sequence control unit 16. Accordingly, the initial phase command generation unit 115 acquires the detection phase corresponding to the phase of the rotor detected by the position detector 22.

Further, the initial phase command generation unit 115 sets the initial value of the phase command value corresponding to the initial phase of the rotor before the startup of the synchronous motor 2 to the first initial phase. Instead of this, the initial phase command generation unit 115 may set the initial value of the phase command value to the first initial phase without relying on the control from the sequence control unit 16.

The initial phase command generation unit 115 may change the first initial phase to the second initial phase, for example, when there is a phase difference equal to or larger than the predetermined value using the phase difference between the first initial phase and the detection phase. The second initial phase set at the time of correction may be set within the phase of the end portion dividing the angle region related to the detection phase or within the angle region related to the detection phase.

For example, when the former is used, the initial phase command generation unit 115 can set the second initial phase to be set at the time of correction to be the phase at the end portion dividing the angle region related to the detection phase. The drive control unit 13 can control the driving of the synchronous motor 2 using the phase command value over a predetermined period from the start of control for startup.

Additionally, when the initial phase is adjusted to the above timing, it is in the stage before the synchronous motor 2 is excited and started. This stage is neither the stage in which the rotor rotates due to control, nor the stage prior to the control in which the rotor starts to rotate slightly due to excitation. By adjusting the initial phase at this timing and correcting the position indicated by the phase command, the position when the rotor is stopped can be detected more accurately.

According to the above-described embodiment, the initial phase command generation unit 115 generates the phase command value corresponding to the initial phase of the rotor before the startup of the synchronous motor. The position detector 22 detects the phase of the rotor and outputs the phase. The drive control unit 13 controls the driving of the synchronous motor by using the phase command value. The initial phase command generation unit 115 adjusts the phase command value to approach the phase of the rotor of the detection result by using the detection result of the phase of the rotor detected before startup by the position detector 22. Accordingly, the phase in the low speed region when the synchronous motor 2 is stopped and started can be assigned more accurately.

The synchronous motor 2 of the embodiment is an excitation type synchronous motor. The period before the startup of the synchronous motor 2 may be included in a period before the excitation of the synchronous motor 2. In the control method of the embodiment, a plurality of angle regions are set by dividing the entire electrical angle range of the synchronous motor 2 and these angle regions are used.

The position detector 22 detects the phase of the rotor by using this angle region as an index. The initial phase command generation unit 115 adjusts the initial phase with accuracy in which the angle region is used as a unit.

Modified Example of Embodiment

A modified example of the embodiment will be described.

The adjustment of the initial phase related to the phase command $\theta$ may be performed in such a manner that the initial phase command generation unit 115 applies an offset to the phase $\theta 0$. Instead of this, an adjustment method may be used in which the integral calculation unit 112 directly changes the value of the phase $\Delta\theta$ which is an output value by the command of the initial phase command generation unit 115.

According to at least one of the above-described embodiments, a drive system includes an initial phase command generation unit, a rotor phase detection unit, and a drive control unit. The initial phase command generation unit generates a phase command value corresponding to an initial phase of a rotor before startup of a synchronous motor. The rotor phase detection unit detects a phase of the rotor and outputs the phase. The drive control unit controls the driving of the synchronous motor by using the phase command value. The initial phase command generation unit adjusts the phase command value to approach the phase of the rotor of the detection result by using the detection result of the phase of the rotor detected before startup by the rotor phase detection unit. Accordingly, the phase in the low speed region when the synchronous motor is stopped and started can be assigned more accurately.

Although some embodiments of the present invention have been described, these embodiments are presented as examples and are not intended to limit the scope of the invention. These embodiments can be implemented in various other forms, and can be omitted, replaced, and changed in various ways that do not deviate from the invention. These embodiments and their modifications are also included in the invention described in the claims and the equivalent range thereof, as included in the scope of the invention and the essentials.

REFERENCE SIGNS LIST

1 Drive system
2 Synchronous motor
3 Inverter
4 Exciter
10 Control unit
11 First phase estimation unit
12 Second phase estimation unit
13 Drive control unit
14 Voltage integrator (state estimation unit)
15 State determination unit
16 Sequence control unit
22 Position detector

The invention claimed is:

1. A drive system comprising:
an initial phase command generation unit that generates a phase command value corresponding to an initial phase of a rotor before startup of an excitation type synchronous motor;
a rotor phase detection unit that detects a phase of the rotor during an excitation period in which the synchronous motor is excited before the startup of the synchronous motor and outputs the phase; and a drive control unit that controls the driving of the synchronous motor by using the phase command value, wherein the initial phase command generation unit adjusts the phase command value to approach the phase of the rotor of a detection result by using the detection result of the phase of the rotor detected during the excitation period before the startup by the rotor phase detection unit, wherein a plurality of angle regions are set by dividing an entire electrical angle range of the synchronous motor, wherein the rotor phase detection unit detects the phase of the rotor by using the angle region as an index, wherein the initial phase command generation unit adjusts the initial phase with accuracy in which the angle region is used as a unit, wherein the angle region is equally divided into predetermined angles defined larger in a range required to start the synchronous motor, wherein the initial phase command generation unit sets an initial value of the phase command value corresponding to the initial phase of the rotor before the startup of the synchronous motor as a first initial phase, wherein the rotor phase detection unit outputs the phase of the rotor detected before the startup as a detection phase, and wherein the initial phase command generation unit sets the initial phase as a second initial phase by using a phase difference between the first initial phase and the detection phase.

2. The drive system according to claim 1, wherein the synchronous motor is an excitation type synchronous motor including an excitation winding.

3. The drive system according to claim 1, wherein the initial phase command generation unit sets the second initial phase as a phase of an end portion dividing the angle region related to the detection phase.

4. The drive system according to claim 1, wherein the drive control unit controls the driving of the synchronous motor by using the phase command value over a predetermined period from a start of control for the startup.

5. A control method applying a computer of a drive system, the drive system including a rotor phase detection unit detecting a phase of a rotor of an excitation type synchronous motor during an excitation period in which the synchronous motor is excited before startup of the synchronous motor and outputting the phase and a drive control unit controlling the driving of the synchronous motor by using a phase command value, the method comprising:

generating the phase command value corresponding to an initial phase of the rotor before the startup of the synchronous motor by adjusting the phase command value to approach the phase of the rotor of a detection result using the detection result of the phase of the rotor detected during the excitation period before the startup of the synchronous motor by the rotor phase detection unit, wherein a plurality of angle regions are set by dividing an entire electrical angle range of the synchronous motor, and wherein the method further comprises:

detecting the phase of the rotor by using the angle region as an index, adjusting the initial phase with accuracy in which the angle region is used as a unit, the angle region being equally divided into predetermined angles defined larger in a range required to start the synchronous motor, setting an initial value of the phase command value corresponding to the initial phase of the rotor before the startup of the synchronous motor as a first initial phase, outputting the phase of the rotor detected before the startup as a detection phase, and setting the initial phase as a second initial phase by using a phase difference between the first initial phase and the detection phase.

6. A drive system comprising:

an initial phase command generation circuit that generates a phase command value corresponding to an initial phase of a rotor before startup of an excitation type synchronous motor;

a rotor phase detection circuit that detects a phase of the rotor during an excitation period in which the synchronous motor is excited before the startup of the synchronous motor and outputs the phase; and a drive control circuit that controls the driving of the synchronous motor by using the phase command value, wherein the initial phase command generation circuit adjusts the phase command value to approach the phase of the rotor of a detection result by using the detection result of the phase of the rotor detected during the excitation period before the startup by the rotor phase detection circuit, wherein a plurality of angle regions are set by dividing an entire electrical angle range of the synchronous motor, wherein the rotor phase detection circuit detects the phase of the rotor by using the angle region as an index, wherein the initial phase command generation circuit adjusts the initial phase with accuracy in which the angle region is used, wherein the angle region is equally divided into predetermined angles defined larger in a range required to start the synchronous motor, wherein the initial phase command generation circuit sets an initial value of the phase command value corresponding to the initial phase of the rotor before the startup of the synchronous motor as a first initial phase, wherein the rotor phase detection circuit outputs the phase of the rotor detected before the startup as a detection phase, and wherein the initial phase command generation circuit sets the initial phase as a second initial phase by using a phase difference between the first initial phase and the detection phase.

* * * * *